United States Patent [19]

Komukai

[11] Patent Number: 4,630,754

[45] Date of Patent: Dec. 23, 1986

[54] FUEL SUPPLY SYSTEM

[75] Inventor: Shigemi Komukai, Yokohama, Japan

[73] Assignee: Tokico Ltd., Kanagawa, Japan

[21] Appl. No.: 657,016

[22] Filed: Oct. 2, 1984

[30] Foreign Application Priority Data

Oct. 15, 1983 [JP] Japan ................................ 58-193027
May 19, 1984 [JP] Japan ................................ 59-101278

[51] Int. Cl.⁴ .......................... B67D 5/32; G05B 1/03

[52] U.S. Cl. ........................................ 222/28; 222/23; 222/39; 364/146

[58] Field of Search ....................... 222/23, 28, 39, 71; 340/679, 691, 540; 364/146, 188; 235/381, 379

[56] References Cited

U.S. PATENT DOCUMENTS

| | | | |
|---|---|---|---|
| 3,602,695 | 8/1971 | Boss | 235/381 |
| 3,778,595 | 12/1973 | Hatanaka et al. | 235/379 |
| 3,845,277 | 10/1974 | Voss et al. | 235/379 |
| 4,190,884 | 2/1980 | Medina | 364/146 X |
| 4,250,550 | 2/1981 | Fleischer | 222/23 |
| 4,354,620 | 10/1982 | Tsuneda et al. | 222/14 |
| 4,395,626 | 7/1983 | Barker et al. | 235/381 |
| 4,485,373 | 11/1984 | Cole | 340/522 |
| 4,575,719 | 3/1986 | Bertagna et al. | 235/381 X |

*Primary Examiner*—H. Grant Skaggs
*Assistant Examiner*—Nils E. Pedersen
*Attorney, Agent, or Firm*—Wenderoth, Lind & Ponack

[57] ABSTRACT

On operating a fuel metering unit with a fuel feed nozzle through a number of operational stages, the current condition of the metering unit is detected by a detector, and a guide which is provided on or in the vicinity of the metering unit is actuated by a signal from a control system specifying a predetermined form of guidance as to the action to be taken in the next step of operation of the metering unit according to a signal from the detector, thereby guiding the operator step by step with the progress of a fuel filling operation by the metering unit.

3 Claims, 15 Drawing Figures

Fig. 4

| DATA OF FULL LEVEL SENSOR 17 | DATA CONFIRMING PULSE OUTPUT OF FLOW RATE GENERATOR 8 | DATA OF START/STOP OF PULSES FROM FLOW RATE GENERATOR 8 | DATA OF INSET SENSOR 16 | DATA OF NOZZLE SWITCH 19 | DATA OF UNIT SELECTOR SWITCH 23 | DATA OF CARD READER 21 OR POS 26 | DATA OF VEHICLE SENSOR 20 | FORMAT OF GRAPHIC/VOCAL GUIDE |
|---|---|---|---|---|---|---|---|---|
| 0 | 0 | 0 | 0 | 0 | 0 | 0 | 0 | A |
| 0 | 0 | 0 | 0 | 0 | 0 | 0 | 1 | B · C |
| 0 | 0 | 0 | 0 | 0 | 0 | 1 | 1 | |
| 0 | 0 | 0 | 0 | 0 | 1 | 1 | 1 | G |
| 0 | — | 0 | 0 | 1 | 1 | 1 | 1 | |
| 0 | — | 0 | 1 | 1 | 1 | 1 | 1 | K |
| 0 | 1 | 1 | 1 | 1 | 1 | 1 | 1 | M |
| 1 | 1 | 0 | 1 | 1 | 1 | 1 | 1 | O |
| 0 | 1 | 0 | 1 | 1 | 1 | 1 | 1 | Q |
| 1 | 1 | 0 | 0 | 1 | 1 | 1 | 1 | P |
| 0 | 1 | 0 | 0 | 1 | 1 | 1 | 1 | R |
| 0 | 1 | 0 | 0 | 0 | 1 | 1 | 1 | I |
| 1 | 1 | 0 | 0 | 0 | 1 | 1 | 1 | J |

Fig. 5

| DATA OF FULL LEVEL SENSOR 17 | DATA CONFIRMING PULSE OUTPUT OF FLOW RATE GENERATOR8 | DATA OF START/STOP OF PULSES FROM FLOW RATE GENERATOR 8 | DATA OF INSET SENSOR 16 | DATA OF NOZZLE SWITCH 19 | DATA OF UNIT SELECTOR SWITCH 23 | DATA OF CARD READER 21 OR POS 26 | DATA OF VEHICLE SENSOR 20 | FORMAT OF GRAPHIC/ VOCAL GUIDE |
|---|---|---|---|---|---|---|---|---|
| 0 | 0 | 0 | 0 | 0 | 0 | 0 | 1 | F |

Fig. 6

| DATA OF FULL LEVEL SENSOR 17 | DATA CONFIRMING PULSE OUTPUT OF FLOW RATE GENERATOR8 | DATA OF START/STOP OF PULSES FROM FLOW RATE GENERATOR 8 | DATA OF INSET SENSOR 16 | DATA OF NOZZLE SWITCH19 | DATA OF UNIT SELECTOR SWITCH 23 | DATA OF CARD READER 21 OR POS 26 | DATA OF VEHICLE SENSOR 20 | FORMAT OF GRAPHIC/ VOCAL GUIDE |
|---|---|---|---|---|---|---|---|---|
| 0 | 0 | 0 | 0 | 1 | 0 | 0 | 1 | E |
| 0 | 0 | 0 | 0 | 1 | 0 | 1 | 1 | E |
| 0 | 0 | 0 | 0 | 0 | 1 | 1 | 1 | H |
| 0 | 0 | 0 | 0 | 1 | 1 | 1 | 1 | L |
| — | 1 | 0 | 1 | 1 | 1 | 1 | 1 | N |

Fig. 8 (a)

| DATA | Graphic Display | Vocal Phrases |
|---|---|---|
| A | 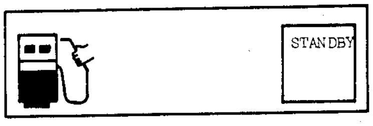  | |
| B | 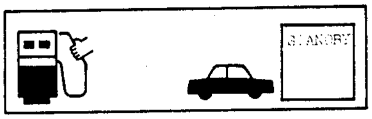 Vehicle flickered | Welcome! You are guided by voice and graphic display for a filling operation. |
| C | 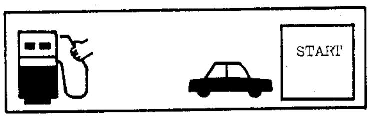  | (Chime) Please insert card in the card reader. |
| D | 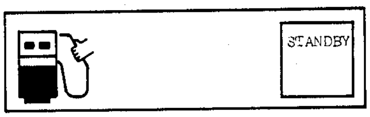  | (Beep) From the start, please. |
| E | 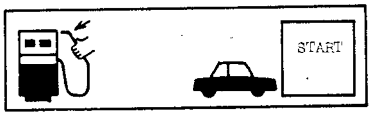  Arrow flickered until nozzle is set properly. | (Beep) Please insert your card and push the selector switch befor detaching the nozzle. |
| F | 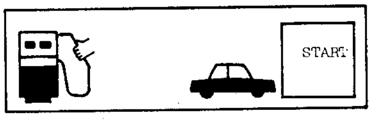  | |
| G | 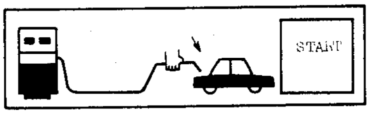  (1) (1) & (2) flickered until inset sensor ditects. 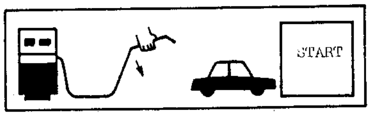  (2) | (Chime) Please detach the nozzle and set it in the fuel tank of your vehicle. |

Fig. 8 (b)

| DATA | Graphic Display | Vocal Phrases |
| --- | --- | --- |
| H | 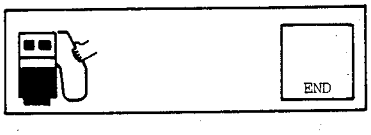  | (Chime) Please insert your card if you need a fuel supply. |
| I | 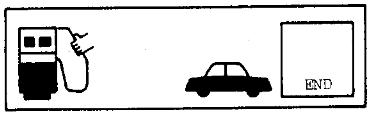  | (Chime) It was OO liters, OOliters. Thank you very much. Please do not forget to clse your fuel tank. |
| J | 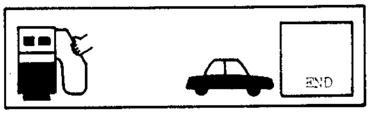  FILL flickered. | (Chime) It was OO liters, OOliters. Thank you for a full replenishment. Please do not forget to close your fuel tank. |
| K | 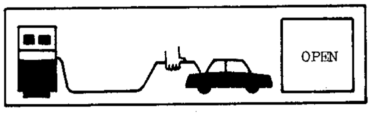  | (Chime) Grip the nozzle lever and fill to an amount you need. |
| L | 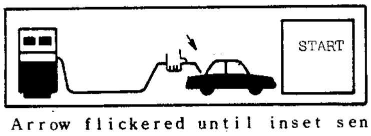  Arrow flickered until inset sensor detects. | (Beep) The nozzle is not set in the fuel tank. |
| M | 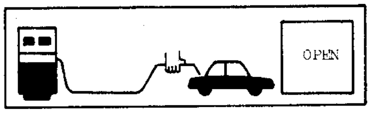  OPEN flickered. | (A melody starts) |
| N | 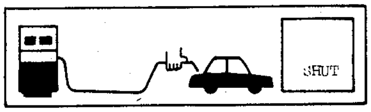  | (Beep) Please close the nozzle lever. |

Fig. 8 (c)
| DATA | Graphic Display | Vocal Phrases |
| --- | --- | --- |
| O | 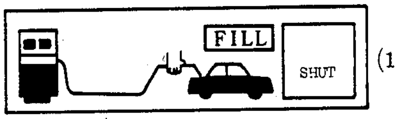  (1)<br>(1)&(2) flickered until the nozzle sesor becomes off.<br>  (2) | (Chime) It is full now. Please close the nozzle lever and hang it on the punp. |
| P | 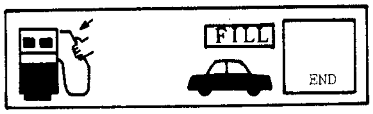 <br>Arrow flickered until the nozzle is hung up, and FILL flickered continuedly. | |
| Q | 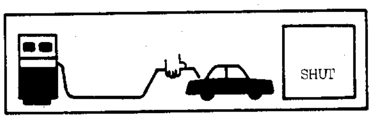  | (Chime) Please hang the nozzle on the pump if you are finished. |
| R | 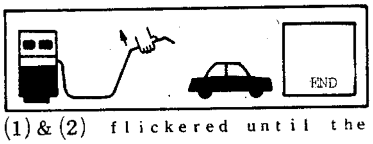  (1)<br>(1) & (2) flickered until the nozzle is hung up.<br>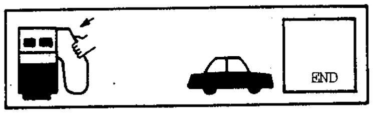  (2) | |

FUEL SUPPLY SYSTEM

BACKGROUND OF THE INVENTION

1. Field of the Invention

This invention relates to a fuel supply system which is suitable for application to self-service type fuel dispensers at filling stations.

2. Description of the Prior Art

Generally, a self-service type fuel dispenser which is installed at a filling station is usually operated not by a trained operator but individually by a driver or a passenger of a motor vehicle Therefore, the fuel dispensers of this sort, which are intended for operations by untrained ordinary users, are preferred to be able to guide the users appropriately and in a reliable manner for the actions required to perform the filling operation according to predetermined procedures.

In this regard, there has been known in the art a self-service type fuel dispenser which is provided with a rotary guide device on the front panel of a fuel metering unit, sequentially turning an instruction screen of the guide device prior to a filling operation to show the operating procedures beforehand.

However, even if the operating procedures are shown beforehand by such a guide means, as a matter of fact it has been difficult for the users to perform the complicated filling operation without errors.

It is also known in the art to provide a speaker in the vicinity of a fuel dispenser thereby to give a verbal guide prior to operation, which is delivered by reproduction of a recorded cassette tape or directly from a supervisor who is stationed in the office for this purpose.

As in the case of the rotation of the instruction screen of the above-mentioned guide device, however, it is difficult for a user to handle the fuel dispenser exactly according to the predetermined procedures which had been instructed beforehand by reproduction of a cassette tape. On the other hand, the verbal instructions given directly by a stationed supervisor can ensure safe operation of the machine but it is contradictory to the policy of promoting the self-service fuel dispensers.

SUMMARY OF THE INVENTION

It is an object of the present invention to provide a self-service type fuel supply system which is capable of guiding the operator step by step to perform a fuel filling operation correctly according to predetermined procedures.

It is another object of the present invention to provide a fuel supply system of the type mentioned above, which is arranged to detect sequentially the operating condition of a fuel metering unit and to teach the operator the operating procedures step by step through the various stages of the filling operation by means of a graphic display or a combination of a graphic display and a voice generator.

According to the present invention, there is provided a self-service type fuel supply system which is characterized by the provision of: at least one metering unit having a pump and a flowmeter for supplying a metered amount of fuel through a fuel feed nozzle provided at the distal end of a fuel feed hose; a detector for detecting the operating condition of the metering unit in various operational stages thereof; a guide means actuatable to give an operator information to the next step of operation of the metering unit; and a control system for controlling the guide means, the control system being arranged to send the guide means a signal of a predetermined form of guidance according to a signal from the detector to change the contents of the information to the next step of operation in each operational stage of the metering unit.

BRIEF DESCRIPTION OF THE DRAWINGS

The above and other objects, features and advantages of the invention will become apparent from the following description and appended claims, taken in conjunction with the accompanying drawings which show by way of example some preferred embodiments of the invention and in which:

FIG. 4 is a table explanatory of the data stored in a normal - normal guide data area;

FIG. 5 is a table explanatory of the data stored in abnormal - normal guide data area of FIG. 3;

FIG. 6 is a table explanatory of the data stored in normal - abnormal guide data area of FIG. 3;

FIGS. 8(*a*) to 8(*c*) are diagrams showing graphic and verbal guide formats A to R.

DESCRIPTION OF PREFERRED EMBODIMENTS

Figure 1:
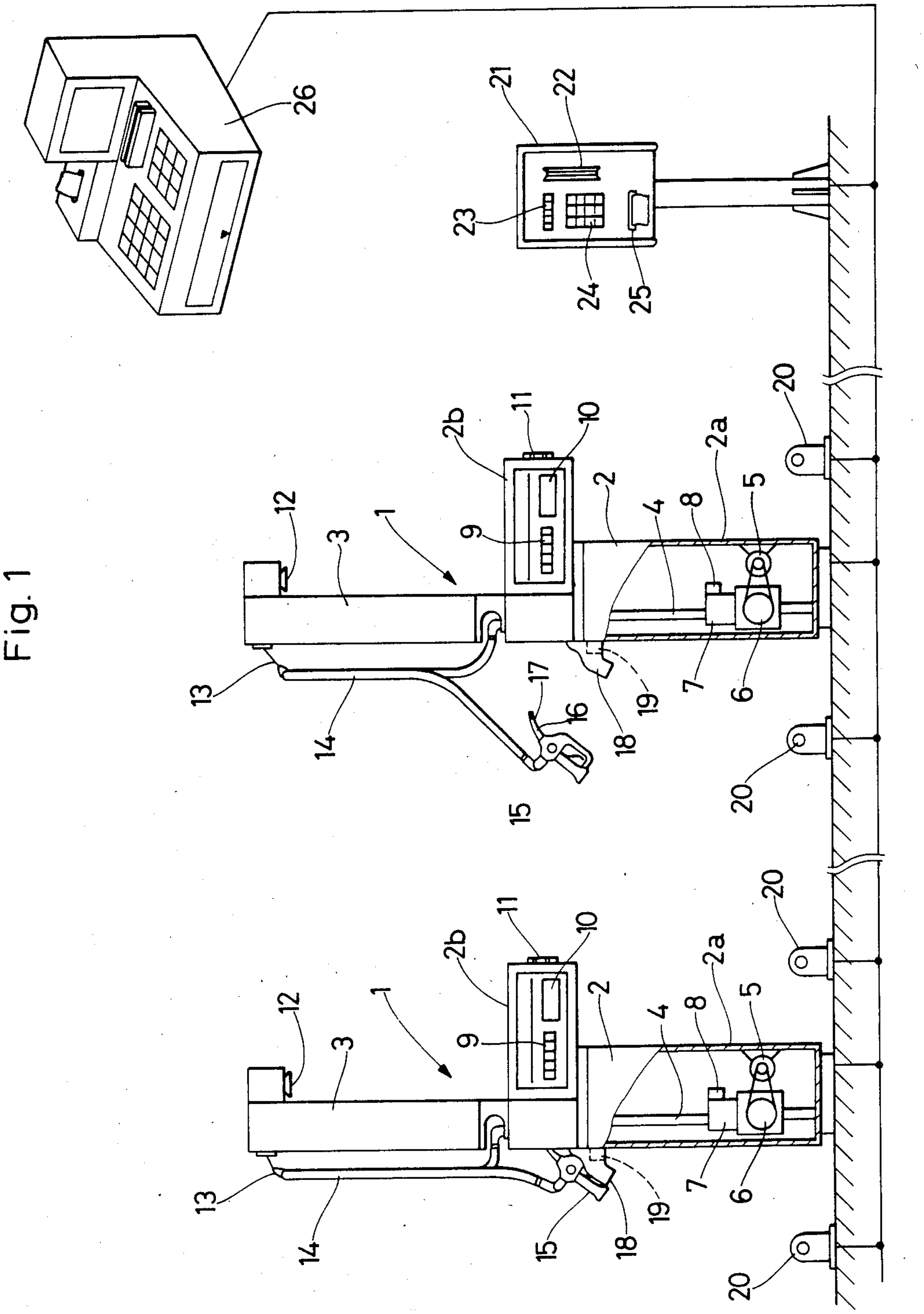
FIG. 1 is a schematic illustration of a fuel supply system embodying the present invention.

Referring to FIG. 1, there is shown the general arrangement of a fuel supply system according to the present invention, in which indicated at 1 are metering units each having a main body 2 including a metering section **2*a* and a display section 2*b*, and a mast portion 3. Provided in the metering section 2*a* is a fuel feed pipe 4 having within its length a pump 6 driven from a motor 5 and a flowmeter 7 with a flow rate generator 8 which produces pulse signals in proportion to the flow rate of the fuel. Mounted on the front side of the display section 2*b* is a counter 9 for indicating an integrated amount of supplied fuel, and a guide display for graphically indicating the operating procedure of the metering unit 1. A preset switch 11 is mounted on a lateral side of the housing of the display section 2*b* for presetting the quantity of fuel supply, and a guide control which will be described later is accommodated in the display section 2*b***.

On the other hand, a loudspeaker 12 is mounted on one side of the mast portion 3, and, on the opposite side, a hose 14 which is connected at its base end to the fuel feed pipe 4 is hung on a hanger cord 13 which is connected to a tractor mechanism (not shown).

Denoted at 15 is a fuel feed nozzle which is fixed at the distal end of the duel feed hose 14, and which has at its nose end an inset sensor 16 for detecting inset of the fuel feed nozzle 15 in a fuel tank of a vehicle and a full level sensor 17 for detecting the liquid surface in the fuel tank reaching a predetermined full level. The reference numeral 18 indicates a nozzle holder which is provided on the main body 2 for releasably holding the fuel feed nozzle 15. The nozzle holder 18 is interiorly provided with a nozzle switch 19 to be opened and closed as the fuel feed nozzle 15 is put on and off the nozzle holder 18.

Designated at 20, 20 are vehicle sensors which detect arrival of a vehicle in the respective service areas, each of which are constituted, for example, by an optical sensor consisting of a light emitting element and a light receiving element which are located in vis-a-vis positions.

A reader printer 21 which is provided in the vicinity of the metering units 1 includes a card reader 22 for reading customer's cards, a metering unit selector switch 23 for selecting one of the metering units 1, service keys 7 to be operated for specifying the desired merchandise other than gasolines, for example, for specifying replenishment of oil or air, replacement of tires and the like, and a printer 25 for issuing a receipt after a fuel supply or sales of merchandise.

Denoted at 26 is an office system (hereinafter referred to simply as "POS 26" for brevity) which is installed in the filling station office, and which has, in addition to the functions of the reader printer 21, the functions of presetting the amount of fuel supply in place of the preset switch 26 and calculating the sales accounts.

Figure 2:
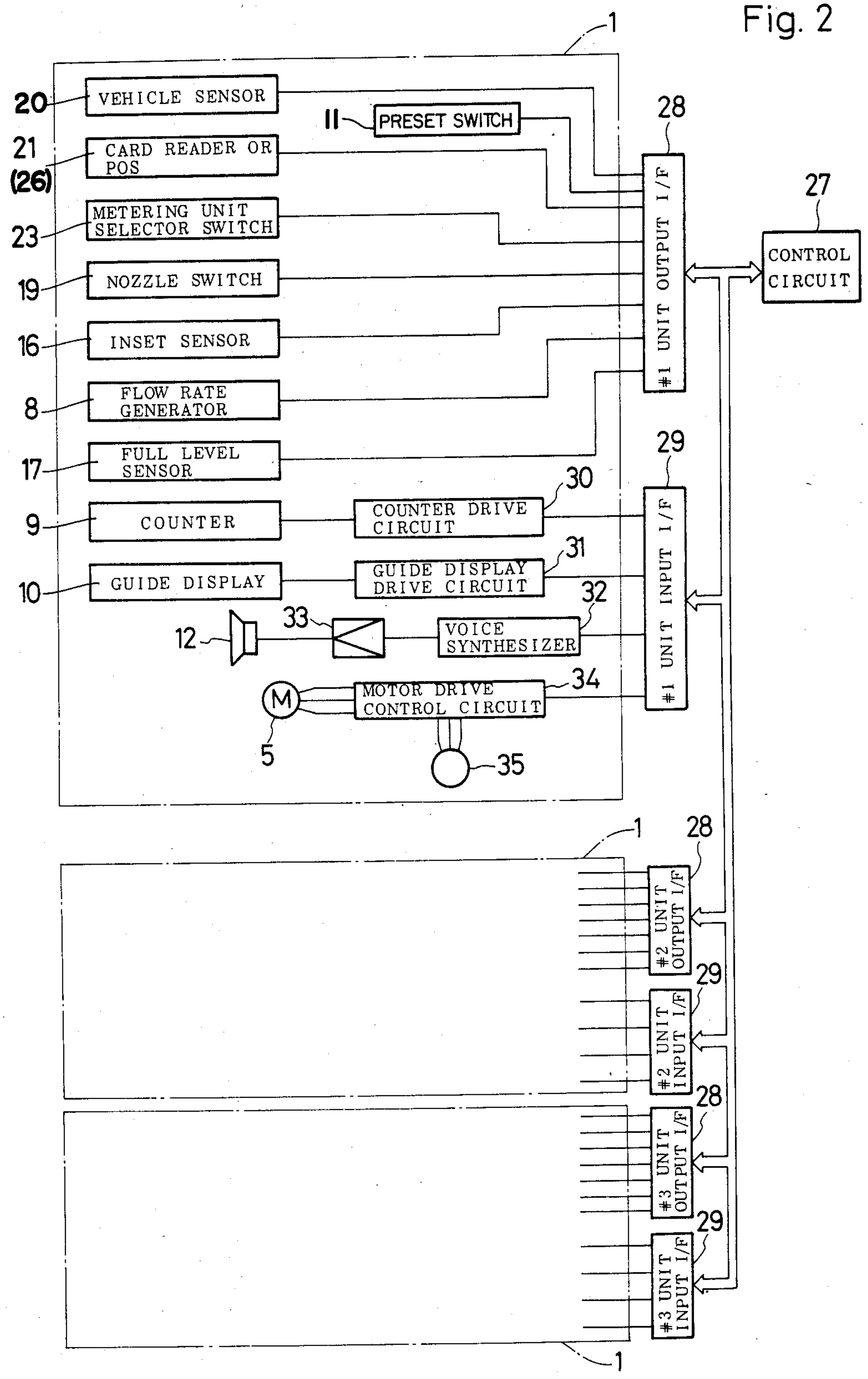
FIG. 2 is a circuit diagram of the fuel supply system.

Referring now to FIG. 2, there is shown a circuit diagram of the fuel supply system of the present embodiment, in which indicated at 27 is a control system which will be described in greater detail with reference to FIG. 3. The control system 27 is connected to the sensors and switches on the respective metering unit 1 through a corresponding number of output interface circuits 28 (hereinafter referred to simply as "output I/F 28" for brevity) and input interface circuits 29 (hereinafter referred to simply as "input I/F 29" for brevity). More particularly, the output I/F 28 is connected to the flow rate generator 8, preset switch 11, inset sensor 16, full level sensor 17, nozzle switch 19, vehicle sensor 20, reader printer 21 or POS 26, and metering unit selector switch 23.

On the other hand, the input I/F 29 is connected to the counter 9 through a counter drive circuit 30 which drives the respective digits and figures of the counter 9, and at the same time to the guide display 10 through a guide display drive circuit 31 which drives the respective patterns and characters of the guide display 10. Indicated at 32 is a voice synthesizer which generates the vocal guide phrases stored in ROM (not shown) under control of the control system 27. The input I/F 29 is connected to the speaker 12 through the voice synthesizer 32 and an amplifier 33. Further, the input I/F 29 is connected to a motor drive control circuit 34 which connects and disconnects the motor 5 to and from the mains source 35 according to a signal from the control system 27 thereby to start and stop the motor 5. In the following description, the fuel supply system of the invention is described by way of a filling station with a row of three metering units 1.

Figure 3:
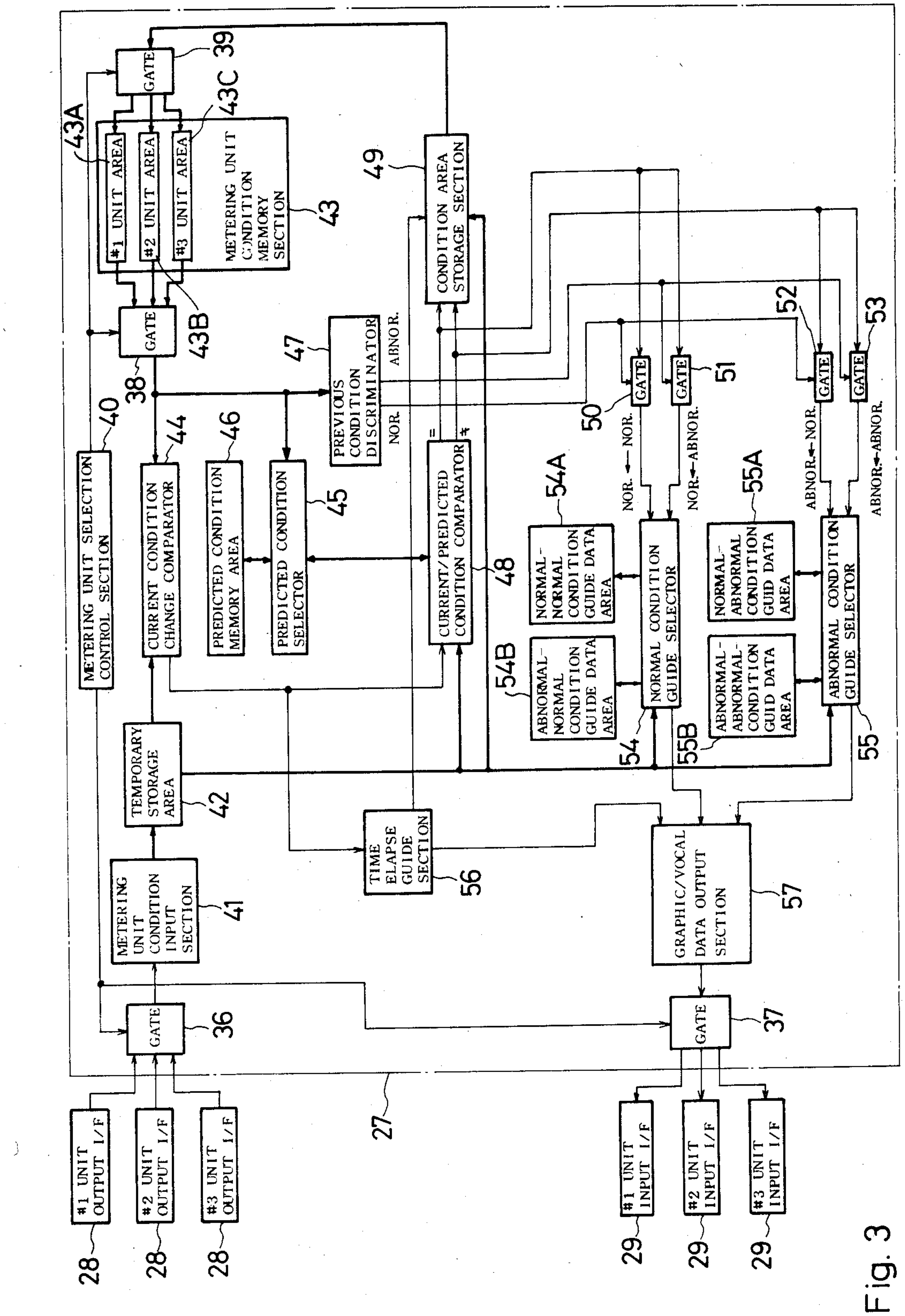
FIG. 3 is a circuit diagram of the guide control constituting part of the fuel supply system of FIG. 2.

FIG. 3 is a circuit diagram of the control system 27 shown in FIG. 2, in which a counter for counting the pulse signals from the flow rate generator 8, a motor control section for controlling the start and stop of the motor 5 in response to the opening and closing of the nozzle switch 19, and a preset control section for controlling a preset fuel supply as specified by actuation of the preset switch 11 are omitted for the sake of simplicity of illustration.

In FIG. 3, indicated at 36 to 39 are gates, at 40 is a metering unit selection control section, at 41 is a metering unit condition input section, at 42 is an area for temporarily storing the conditions of the metering units (hereinafter referred to simply as "temporary storage area" for brevity), at 43 is a metering unit condition memory section consisting of an area 43A for storing the condition of #1 metering unit, an area 43B for storing the condition of #2 metering unit and an area 43C for storing the condition of #3 metering unit, at 44 is a current condition change comparator, at 45 is a predicted condition selector, at 46 is a predicted condition memory area, at 47 is a previous condition discriminator, at 48 is a current/predicted condition comparator, at 49 is a condition area storage section, at 50 to 53 are gates, at 54 is a normal condition guide selector having a normal→normal guide data area 54A and an abnormal→normal condition guide data area 54B, at 55 is an abnormal condition guide selector having a normal→abnormal guide data area 55A and an abnormal→abnormal guide data area 55B, at 56 is a time lapse guide section, and at 57 is a graphic/vocal data output section.

In this instance, the gate 36 controls the input signals from #1 to #3 metering units; the gate 37 controls the output graphic/vocal data to be fed to the input I/F 29 of #1 to #3 metering units from the graphic/vocal data output section 57; the gate 38 controls output of the metering unit conditions stored in the respective areas 43A to 43C of the metering unit condition memory section 43, to be fed to the current condition change comparator 44, predicted condition selector 45, and previous condition discriminator 47; and the gate 39 controls the input of the metering unit conditions stored in the condition area storage section 49, to the respective areas 43A to 43C of the metering unit condition memory section 43. These gates 36 to 39 are arranged to open the gates at predetermined determined time intervals in the order of #1 unit, #2 unit and #3 unit under control of the metering unit selection control section 40, and, for the respective metering units 1, in the order of gate 36 to gate 39.

The metering unit condition input section 41 has a function of expressing the conditions of the respective metering units in the form of an 8-digits code by converting the input signals received from the respective metering units through the gate 36 into binary logics of "1" and "0" which affirm or negate the presence of the input signals, including, the card read signal from the card reader 21 or POS 26, the selection signal from the metering unit selector switch 23, the nozzle hang-up signal from the nozzle switch 19, the nozzle inset signal from the inset sensor 16, the pulse signal currently produced by the flow rate generator 8, the data confirming production of the pulse signal at any time, and the signal from the full level sensor 17. Hereafter, a unit length of data of the metering unit operating condition which has been coded by the metering unit condition input section 41 is referred to as "metering unit condition data" and expressed, for example, as [00000000], [00000011] and the like.

The temporary storage area 42 temporarily stores the metering unit condition data received from the metering unit condition input section 41 with respect to each metering unit 1, and sends out the metering unit condition data to the current condition change comparator 44, current/predicted condition comparator 48, condition area storage section 49, normal condition guide selector 54 and abnormal condition guide selector 55 under the control which will be described hereinlater.

The metering unit condition memory section 43 stores the metering unit condition data, which is in the condition area storage section 49, in the condition storage areas 43A to 43C of the respective metering units, in timed relation with opening of the gate 39 subsequent to opening of the gates 36 to 38.

The current condition change comparator 44 has functions of comparing the metering unit condition data, which is constantly received from the temporary storage area 42, with the metering unit condition data stored in the storage area 43A to 43C of the metering unit condition storage section 43, in timed relation with opening of the gate 38, and sending a change signal to the current/predicted condition comparator 48 and the time lapse guide section 56 when there is a change in condition, namely, when the current metering unit operating condition stored in the temporary storage area 42 changes from the previous metering unit operating condition stored in the metering unit condition memory section 43.

On the other hand, the predicted condition memory area 46 stores the data of the operating condition in which the metering units are assumed to be after completion of one step of operation. The predicted condition selector 45 has functions of accessing the predicted condition memory area 46 in timed relation with opening of the gate 38 on the basis of the metering unit condition data from the metering unit condition memory section 43 to predict the next operating condition of the metering unit 1 and send out the predicted condition data to the current/predicted condition comparator 48.

The previous condition discriminator 47 stores as a reference for discrimination the data of metering unit conditions in which the metering unit would be in the respective steps if operated in an appropriate order, comparing the input metering unit condition data from the metering unit condition memory section 43 with the reference data to check up the metering unit condition, sending out a normal gate open signal to the gates 50 and 52 if it is normal and sending out an abnormal gate open signal to the gates 51 and 53 if it is abnormal.

Nextly, the current/predicted condition comparator 48 is supplied with the current metering unit condition data from the temporary storage area 42 as well as the predicted metering unit condition data sent from the predicted condition selector 45 on the basis of the previous condition, and has a function of comparing these data upon receipt of and in the same timing with the input of the condition change signal from the current condition change comparator 44, sending out a matching gate signal to the gates 50 and 51 and the condition are storage section 49 if the current metering unit condition data agree with the predicted condition data, and sending out an non-matching gate signal to the gates 52 and 53 and the condition area storage section 49 if not in agreement with the predicted condition.

The condition area storage section 49 functions to open the gate when either the matching gate signal or the non-matching gate signal is received from the current/predicted condition comparator 48, and to renew its contents by the current metering unit condition data from the temporary storage area 42, resetting the stored metering unit condition data upon receipt of a clock signal from the time lapse guide section 56 which will be described hereinlater.

On the other hand, the gate 50 which is supplied with the normal gate open signal from the previous condition comparator 47 and at the same time with the matching gate signal from the current/predicted condition comparator 48 serves to send the matching gate signal to the normal condition guide selector 54, thus operating only when both the previous and current metering unit conditions are normal. Similarly, the gate 51 serves to a matching gate signal to the normal condition guide selector 51 when the condition has changed to normal from a previous abnormal state; the gate 52 serves to send a non-matching gate signal to the abnormal condition guide selector 55 when the condition has changed to abnormal from a previous normal state; and gate 53 serves to send a non-matching signal to the abnormal condition guide selector 55 when both the previous and current conditions are abnormal.

The normal condition guide selector 54 is provided with a normal - normal guide data area 54A for storing the guide data for the cases where both previous and current metering unit conditions are normal (hereinafter referred to as "normal→normal" for brevity), and an abnormal→normal guide data area 54B storing guide data for the cases where the metering unit operating condition has changed from abnormal to normal (hereinafter referred to as "abnormal→normal" for brevity), storing the data of FIGS. 4 and 5 in tabulated form, respectively. Since the normal condition guide selector 54 is supplied with the current metering unit condition data from the temporary storage area 42, it accesses the normal→normal guide data area 54A upon receipt of the matching gate signal of normal→normal through the opened gate 50 to select the data corresponding to the current metering unit condition data, sending the graphic/vocal guide data (corresponding to the forms denoted by reference characters A to R in FIG. 8) to the graphic/vocal vocal data output section 57 of the next stage. On the other hand, when a abnormal→normal matching signal is received through the opened gate 51, the abnormal→normal guide data area 54B is accessed to select graphic/vocal guide data corresponding to the current metering unit condition and send them to the graphic/vocal data output section 57.

The abnormal condition guide selector 55 is provided with a normal→abnormal guide data area 55A for storing guide data for the cases where the metering unit operating condition has changed from normal to abnormal (hereinafter expressed as "normal→abnormal" for brevity), and a abnormal→abnormal guide data area 55B for storing guide data for the cases where both the previous and current metering unit operating conditions are abnormal (hereinafter expressed as "abnormal→abnormal" for brevity). The normal→abnormal guide data area 55A stores the data of FIG. 6 in tabulated form. In the particular embodiment shown, no data are stored in the abnormal→abnormal guide data area 55B since an abnormal→abnormal metering unit operation does not exist. The abnormal condition guide selector 55 which is supplied with the current metering unit condition data from the temporary storage area 42 accesses the normal→abnormal guide data area 55A upon receipt of a non-matching gate signal of normal→abnormal through the opened gate 52 to select graphic/vocal data corresponding to the current metering unit condition data to send them to the graphic/vocal data output section 57. Since the gate 52 is not opened, no access is made to the abnormal→abnormal guide data area 55B.

The time elapse guide section 56 is internally provided with a software timer operating on preset time intervals, for example, 30 seconds, resetting the timer by the condition change signal from the current condition change comparator 44 to re-start the time counting and sending out a time elapse signal to the condition area storage section 49 and graphic/vocal data output section 57 upon an elapse of 30 seconds.

The graphic/vocal data output section 57 which receives the data of guide display/vocal phrases from the normal condition guide selector 54 or the abnormal condition guide selector 55 in addition to the time elapse signal from the time elapse guide section 56 functions to produce the data to be fed to the guide display drive circuit 31 and voice synthesizer 32 of each metering unit 1 through gate 37 and input I/F 29.

Figure 7:
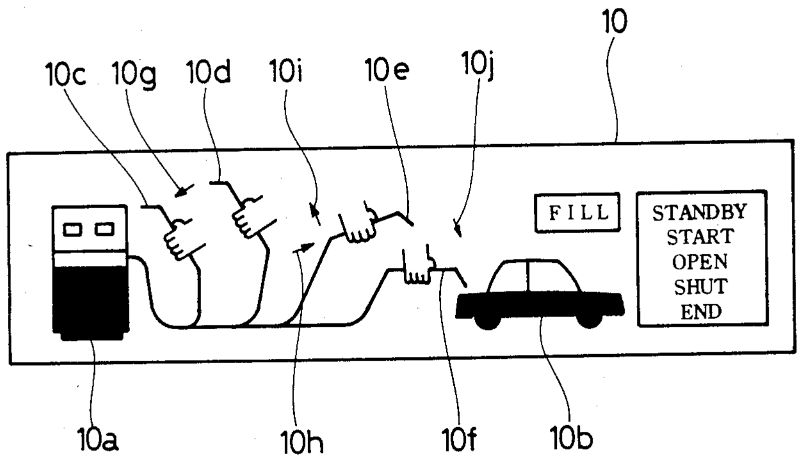
FIG. 7 is a diagrammatic view of a graphic guide display as a whole.

Referring now to FIG. 7, there is shown the general arrangement of the guide display 10 with symbolic figures and letters for guiding purposes, including a FIG. 10*a* indicating a metering unit, a figure 10*b* indicating a vehicle which needs a fuel supply, FIGS. 10*c* to 10*f* indicating various positions of the fuel feed nozzle 15, arrows 10*g* to 10*j* indicating the directions of the fuel feed nozzle 15, a word "FILL" indicating a full state, a word "STANDBY" indicating a standby state, a word "START" indicating start of a filling operation, a word "OPEN" indicating opening of the valve of the fuel feed nozzle 15, and a word "END" indicating the end of the filling operation. The guide display 10 is actuated to present these pictures and characters in the manner as shown at A to R of FIG. 8 by the graphic/vocal data output section 57 of the control system 27, flickering the arrows 10*g* to 10*j* respectively on presentation of a relevant picture if desired.

Shown in FIGS. 8(*a*) to 8(*c*) are exemplary forms of presentation of the graphic and vocal guide data A to R, which are effected by driving the guide display 10 by the guide display drive circuit 31 under control of the graphic/vocal data output section 57. The vocal phrases are presented in audible sound by the voice synthesizer 32 through the speaker 12.

Figure 9:
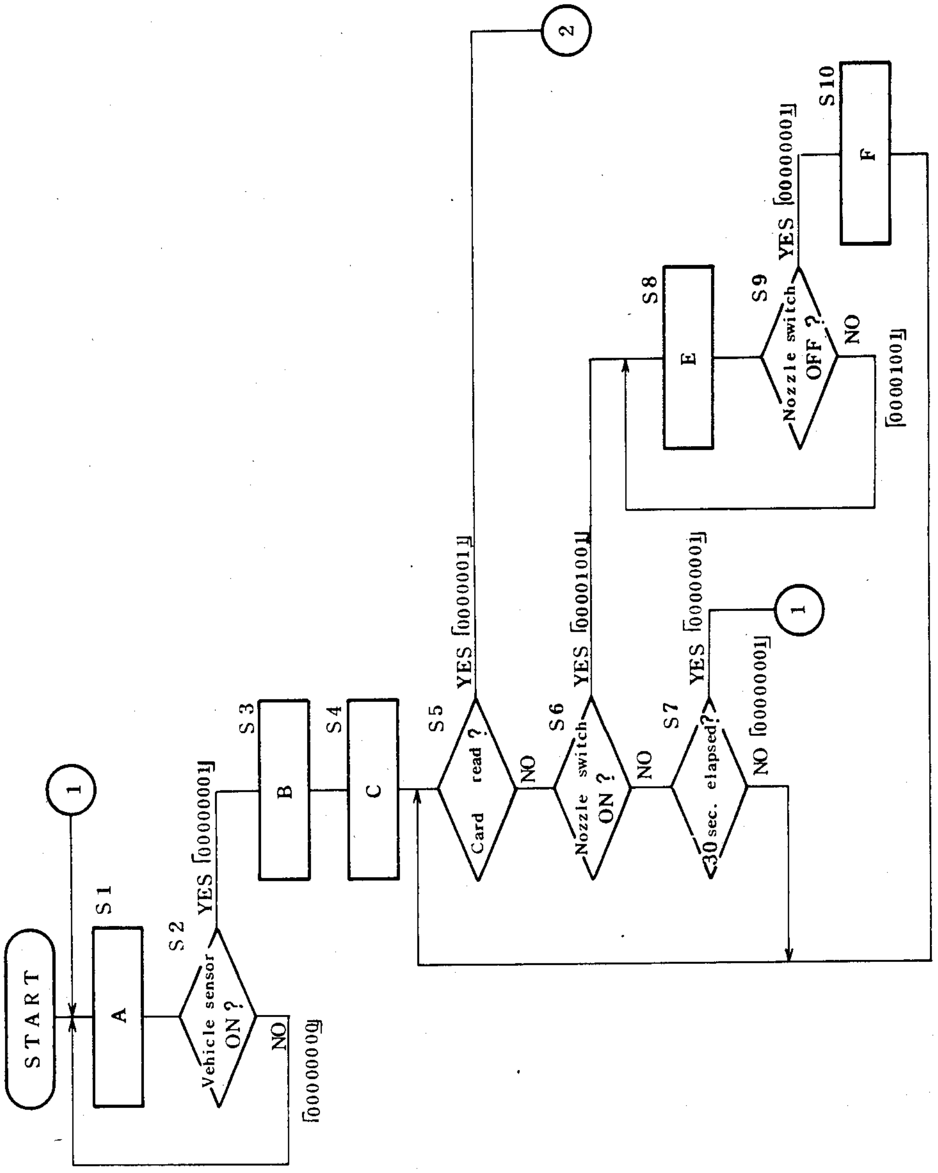
FIGS. 9(*a*) to 9(*e*) are flowsheets showing the steps for selecting the graphic and verbal guide format.
Figure 9:
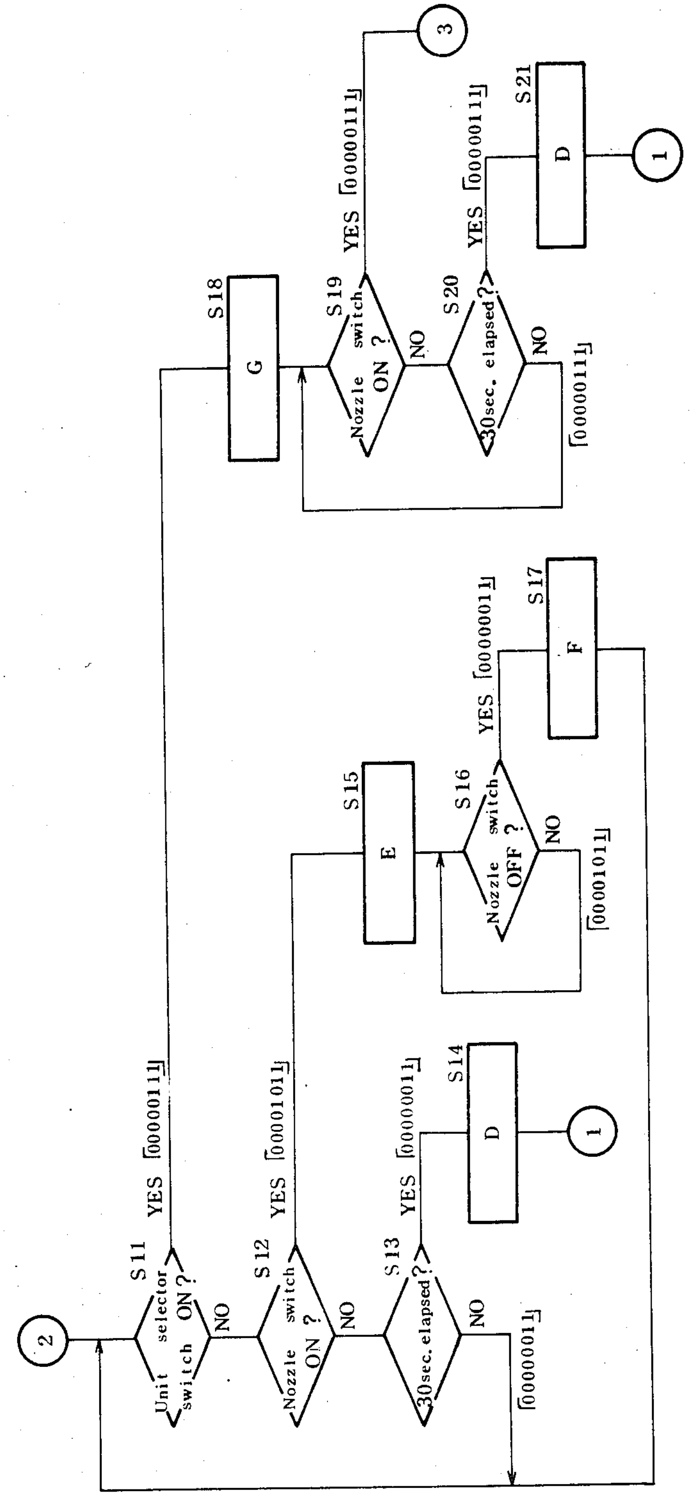
Figure 9:
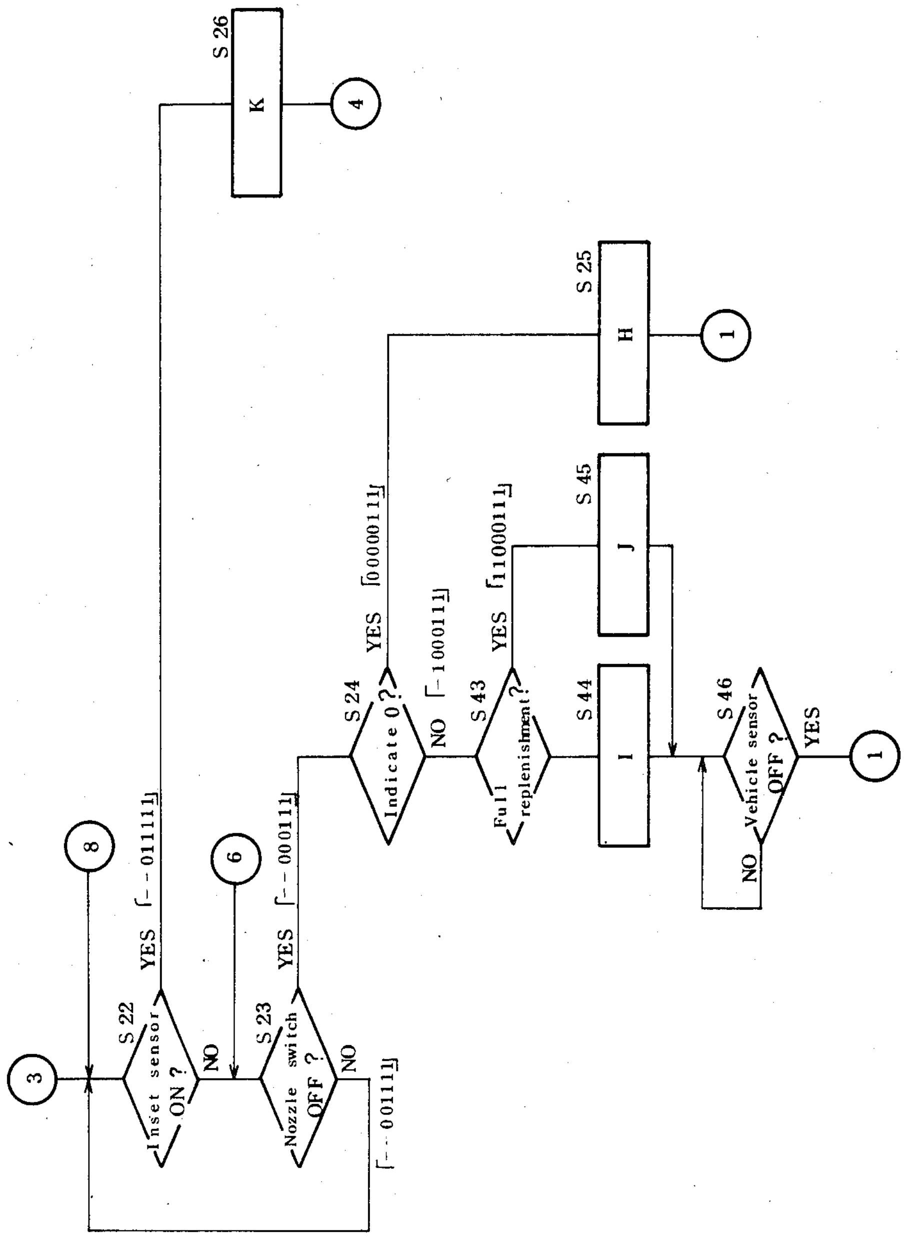
Figure 9:
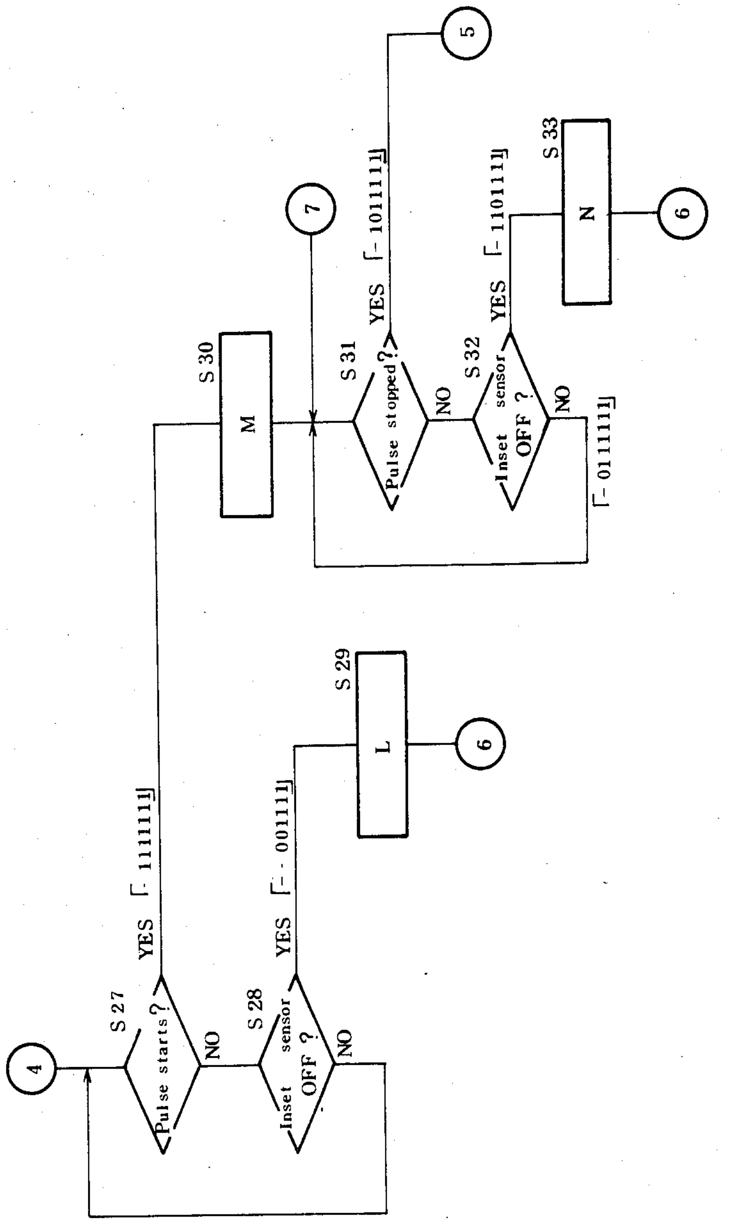
Figure 9:
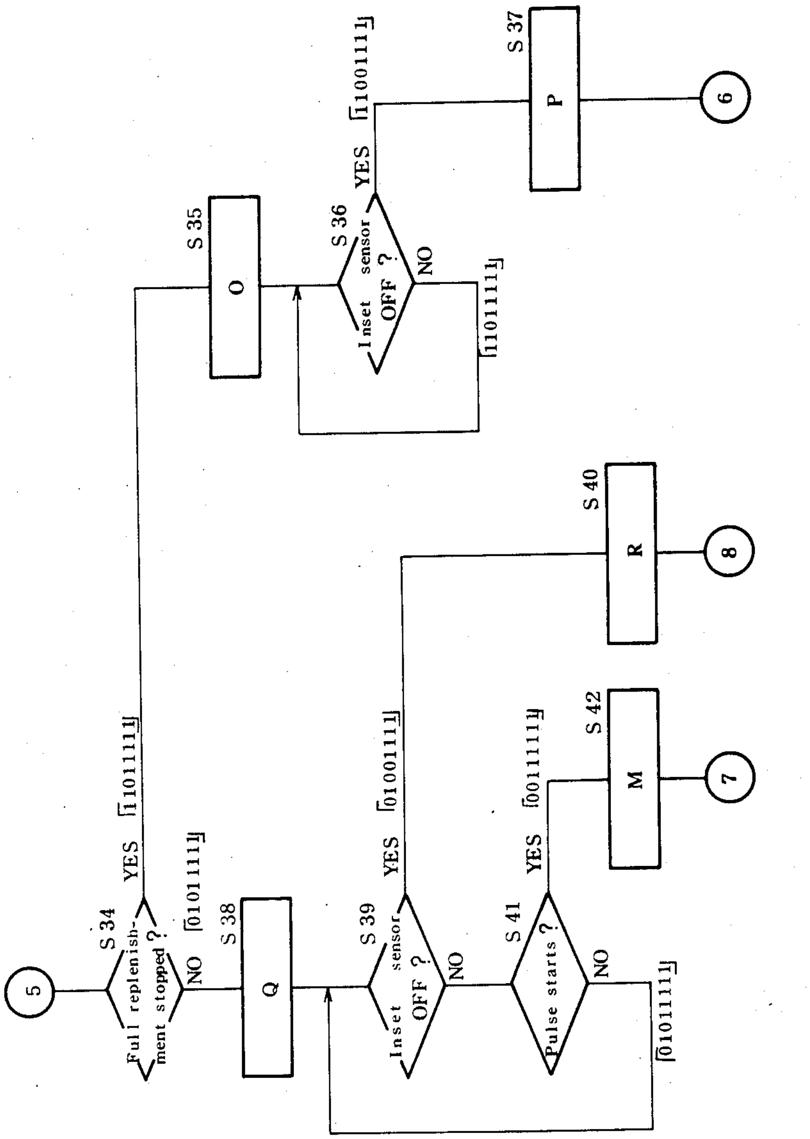

Now, the graphic and verbal guide operations by the fuel supply system of the invention are described with reference to FIG. 9. In FIGS. 9(*a*) to (9*e*), the large letters A to R correspond to the guide steps A to R by graphic display and vocal phrases in FIGS. 8(*a*) to 8(*c*).

Before a vehicle coming into the service area, no signal is fed to the output I/F 28 of each metering unit, and therefore the metering unit condition input section 41 of the control system 27 as well as the temporary storage area 42 and metering unit condition memory section 43 have a content of [00000000]. On the other hand, a time elapse signal which is produced by the time elapse guide section 56 is fed to the condition area storage section 49 to reset its content in the state of [00000000], and at the same time to the graphic/vocal guide data output section 57, which accordingly supply the guide display 10 and speaker 12 with control signals corresponding to the graphic/vocal guide data A (Step S1).

Under these circumstances, if a vehicle comes into the service area and stopped besides one of three metering units 1, for example, besides #1 metering unit, a vehicle sensor 20 of this metering unit is closed (Step S2). The resulting vehicle detection data from the vehicle sensor 20 are fed to the metering unit condition input section 41, coding the metering unit condition data as [00000001] for supply to the temporary storage area 42. Accordingly the metering unit condition data in the temporary storage area 42 is fed to the current condition change comparator 44 and thereby compared with the metering unit condition data [00000000] which is received from #1 metering unit condition area 43A of the metering unit condition memory section 43. By detecting the change of the lowest digit from [0] to [1], the current condition change comparator 44 produces a condition change signal, which is fed to the current/predicted condition comparator 48 to open its gate and at the same time to the time elapse guide section 56 to set its software timer at a time length of 30 seconds.

In the meantime, the metering unit condition data [00000000] from #1 metering unit condition area 43A are fed to the previous condition discriminator 47 for comparison with reference data. In this instance, the metering unit 1 is not yet operated, so that the metering unit condition data are regarded as normal and fed to gates 50 and 52 as a normal gate opening signal, opening these gates 50 and 52 which correspond to a normal previous condition.

The metering unit condition data [00000000] from #1 metering unit area 43A are also fed to the predicted condition selector 45, so that the latter accesses the predicted condition memory area 46 to select the next data [00000001] which is predicted from the input data [00000000], sending the predicted condition data to the current/predicted condition comparator 48. Thus, in response to the condition change signal from the current condition change comparator 44, the current/predicted condition comparator 48 receives the current metering unit condition data [00000001] from the temporary storage area 42 and compares same with the afore-mentioned predicted metering unit condition data [00000001]. Since the current condition data agree with the predicted data in this case, the current/predicted condition comparator 48 produces a matching gate signal to the condition area storage section 49 and gates 50 and 51. As a result, the condition area storage section 49 opens the gate to store there in the metering unit condition data [00000001] from the temporary storage area 42. On the other hand, although the matching gate signal is also fed to the gates 50 and 51, only the gate 50 is opened by the previous condition discriminator 47, so that the matching gate signal is passed through the gate 50 to the normal condition guide selector 54.

Thus, the normal condition guide selector 54 which is supplied with the metering unit condition data [00000001] from the temporary storage area 42 accesses the data stored in the normal - normal guide data area 54A as shown in FIG. 4 in response to the matching gate signal from the gate 50 to select the matching data, using the metering unit condition data as a flag. In this case, the metering unit condition data match the second data array from the top in FIG. 4, so that the formats "B" and "C" are selected for the graphic and vocal guides.

The formats of graphic and vocal guide "B" and "C" thus selected are sent to the graphic/vocal data output section 57 to control the guide display drive circuit 31 and voice synthesizer 32 through the input I/F 29 of #1 metering unit in timed relation with the opening of the gate 37.

The metering unit condition data [00000001] which is stored in the condition area storage section 49 in the above-described manner is stored in #1 metering unit condition area 43A as a previous condition upon opening the gate 39. In this case the gate 39 is adapted to be opened later than the gates 36 to 38, so that of course the previous condition [00000000] is still stored when the gate 38 is opened.

Nextly, the control system 27 checks up: whether or not a card read-out signal is produced by insertion of a card in the card reader 21 or in the card reader of POS 26 (Step S5); whether or not the nozzle switch 19 is closed by lifting up the fuel feed nozzle 15 (Step 6); and whether or not a time elapse signal (elapse of 30 seconds) is produced by the time elapse guide section 56 (Step S7). As soon as the time elapse signal is produced by the time elapse guide section 56 (Step S7), it is fed to the condition area storage section 49 to reset its contents, storing [00000000] in #1 metering unit condition area 43A on opening of the gate 39 to return to Step S1. Then, if the vehicle sensor 20 is open, it means that a vehicle has just passed through the service area, so that the control returns to the standby state.

If the nozzle switch 19 is closed by lifting up the fuel feed nozzle 15 in Step 6, a nozzle closing signal is fed to the metering unit condition input section 41 through gate 36, and thus a data code of [00001001] is thereby produced and fed to the temporary storage area 42. Consequently, the metering unit condition data from the temporary storage area 42 are fed to the current condition change comparator 44, which compares the input data with the metering unit condition data [00000001] and produces condition change signal to the current/predicted condition comparator 48.

On the other hand, the metering unit condition data [00000001] from #1 metering unit condition area 43A are fed to the previous condition discriminator 47 for comparison with the reference data. In this instance, since the vehicle sensor 20 is closed in the first place, the discriminator 47 judges the input metering unit condition data as normal and sends forward as a normal gate open signal to open the gates 50 and 52.

Further, the metering unit condition data [00000001] from #1 metering unit condition area 43A are fed to the predicted condition selector 45 to select predicted condition data [00000011] which are preset in the predicted condition memory area 46 as a next predicted condition of the metering unit operation, sending the predicted condition data to the current/predicted condition comparator 48. Meanwhile, the current/predicted condition comparator 48 which receives the current metering unit condition data [00001001] from the temporary storage area 42 in response to the condition change signal from the current condition change comparator 44 to compare same with the predicted metering unit condition data [00000011]. In this case, the current condition data do not agree with the predicted condition data, so that a non-matching gate signal is fed to the condition area storage section 49 and gates 52 and 53 from the current/predicted condition comparator 48. As a result, the metering unit condition data [00001001] is stored in the condition area storage section 49, and upon opening of the gate 39 they are stored in #1 metering unit condition area 43A. On the other hand, although the non-matching gate signal is fed also to the gates 52 and 53, it is passed through the gate 52 alone and fed to the abnormal condition guide selector 55 since it is only the gate 52 which has been opened by the previous condition discriminator 47.

Accordingly, the abnormal condition guide selector 55 accesses the data which are stored in the normal→abnormal guide data area 55A as shown in FIG. 6, using as a flag the metering unit condition data [00001001] which is fed from the temporary storage area 42, to select the matching data, namely, the data of the top array. In this case, the format of the graphic and vocal guide is "E". The thus selected graphic/vocal guide format "E" is sent to the graphic/vocal data output section 57 to control the guide display drive circuit 31 and voice synthesizer 32 accordingly in the same manner as described hereinbefore. (Step S8)

That is to say, the guide format "E" as indicated in FIG. 8(*a*) is presented by the guide display 10 in Step S8, flickering the arrow 10*g* to draw the user's attention until the fuel feed nozzle 15 is hung up on the nozzle holder 18.

Upon hanging up the fuel feed nozzle 15 (Step S9), the nozzle closing signal to the metering unit condition input section 41 is stopped, and therefore the metering unit condition data, changed from [00001001] to [00000001], are fed to the temporary storage area 42. As a result, the current condition comparator 44 compares same with the metering unit condition data [00001001] from #1 metering unit condition area 43A in the same manner as described hereinbefore, sending a condition change signal to the current/predicted condition comparator 48.

In this instance, the previous condition discriminator 47 which is supplied with the metering unit condition data [00001001] from #1 metering unit condition area 43A, producing an abnormal gate open signal to open the gates 51 and 53 which are opened when a previous condition is abnormal. Further, the data [00001001] from #1 metering unit condition area 43A are fed to the predicted condition selector 45, which therefore supplies the next predicted condition data [00000001] to the current/predicted condition comparator 48. Accordingly, in response to the condition change signal, the comparator 48 compares the metering unit condition data [00000001] from the temporary storage area 42 and the predicted condition selector 45, and produces a matching gate signal to the gates 50 and 51, of which only the gate 51 passes the matching gate signal.

Consequently, the normal condition guide selector 54 accesses the data stored in the abnormal→normal guide data area 54B shown in FIG. 5, using as a flag the metering unit condition data [00000001] from the temporary storage area 42, to select and send the graphic/vocal data "F" to the graphic/vocal data output section 57. Accordingly, the guide of the format which is indicated at F of FIG. 8(*a*) is presented by the guide display 10 (Step S10), returning the control to the step S4 preceding the card reading.

The filling operation in and after the step S11 is guided step by step in the order of FIGS. 9(*b*) and 9(*c*) by graphic and vocal explanations of the formats shown in FIGS. 8(*a*) to 8(*c*).

Although the foregoing description has been directed to one of three metering units, it is to be understood that the same applies to #2 and #3 metering units, and that it is possible to control a plural number of metering units simultaneously without any trouble as the control system 27 controls the gates 36 to 39 by the metering unit selection control section 40.

The present invention has an advantage that, since the operating procedure is displayed according to signals from detectors indicative of the operating condition of the metering unit, the operator can be guided step by step with the progress of the filling operation to reduce the possibilities of misoperations to a minimum.

Another advantage of the invention accrues from the stepwise guidance of the filling operation, which can prevent the operator from proceeding to a next step after a misoperation.

The invention enjoys a further advantage accruing from the combination of the visual guide on a display and verbal guide, which can guide an operator more reliably along a course of actions for the filling operation.

Although the invention has been described by way of a preferred embodiment, it is to be understood that the invention is not limited to the particular forms shown and permits various modifications and alterations without departing from the fundamental concept of the invention.

What is claimed is:

1. A fuel supply system, comprising in combination:

at least one metering unit having a pump and a flowmeter for supplying a metered amount of fuel through a fuel feed nozzle provided at the distal end of a fuel feed hose;

a detector for detecting the operating condition of said metering unit in various operational stages thereof;

a guide means actuatable to give information on the action to be taken in the next step of operation of said metering unit; and a control system for controlling said guide means, arranged to send said guide means a signal of a predetermined form of guidance according to a signal from said detector to change the contents of said information to the next step of operation in each operational stage of said metering unit;

wherein said control system comprises:

a temporary storage means for temporarily storing a current metering unit condition signal supplied from said detector;

a metering unit condition memory means for storing the metering unit condition signal from said temporary storage means as a previous metering unit condition;

a condition predicting means for predicting a next metering unit condition according to the metering unit condition stored in said memory means;

a current condition comparison means for discriminating a change in current metering unit condition by comparing the metering unit conditions stored in said temporary storage means and said memory means;

a current/predicted condition comparison means for comparing the current metering unit condition from said temporary storage means with the predicted condition from said condition predicting means according to the results of comparison by said current condition comparison means; and a guide means control means for controlling said guide means to give a guide for a next step of operation of said metering unit according to the results of comparison by said current/predicted condition comparison means.

2. A fuel supply system as set forth in claim 1, wherein said guide means comprises a display for graphically showing the operational procedures of said metering unit.

3. A fuel supply system as set forth in claim 1, wherein said guide means comprises a voice synthesizer for giving verbal guidance of the operating procedures of said metering unit.

* * * * *